United States Patent [19]
Calmonte et al.

[11] 4,444,407
[45] Apr. 24, 1984

[54] ANTI-THEFT DEVICE FOR MOTORCYCLES APPLIED TO THE PARKING STAND

[76] Inventors: Renzo Calmonte; Silla Martini; Ezio Pinarello, all of Via Bassanese, 35, 31037 Loria (TV), Italy

[21] Appl. No.: 330,356

[22] Filed: Dec. 14, 1981

[30] Foreign Application Priority Data

Oct. 15, 1981 [IT] Italy ................................ 49493 A/81

[51] Int. Cl.³ .............................................. B62H 5/00
[52] U.S. Cl. ..................... 280/297; 280/289 L
[58] Field of Search .......................... 280/297, 289 L; 180/219

[56] References Cited

U.S. PATENT DOCUMENTS

| | | | |
|---|---|---|---|
| 1,587,382 | 6/1926 | Kendal | 280/297 |
| 2,999,696 | 9/1961 | Ringelstetter | 280/297 |
| 4,298,211 | 11/1981 | Shitamori | 280/297 |

Primary Examiner—Joseph F. Peters, Jr.
Assistant Examiner—Donn McGiehan
Attorney, Agent, or Firm—Beveridge, DeGrandi and Kline

[57] ABSTRACT

An anti-theft device for motorcycle parking stands is automatically engaged when the motorcycle is raised up onto the stand and is disengaged by means of a key, another mechanical device, or an electrical contact, so as to enhance the traditional function of the parking stand by making movement of the motorcycle impossible without disengaging the device.

7 Claims, 11 Drawing Figures

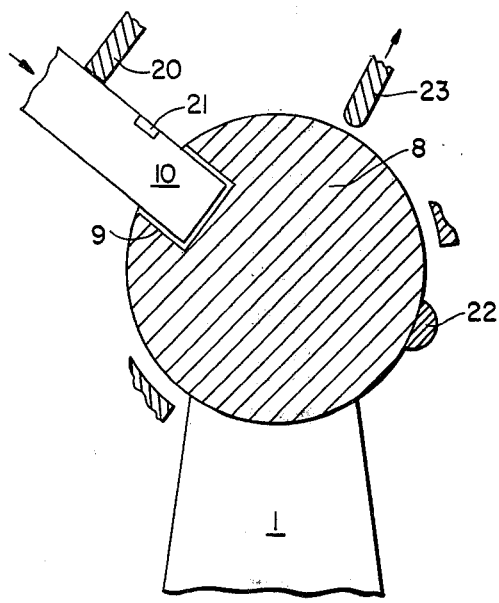
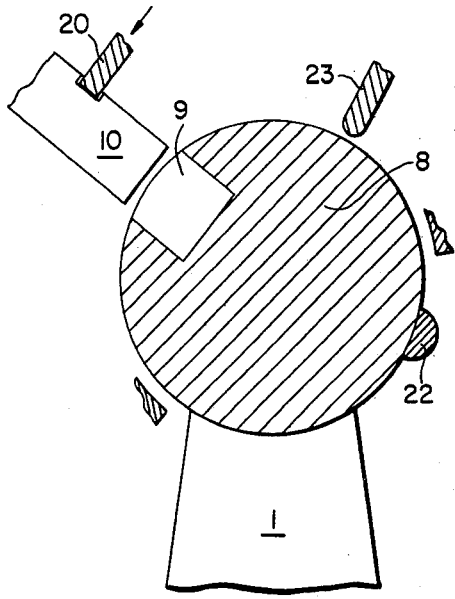
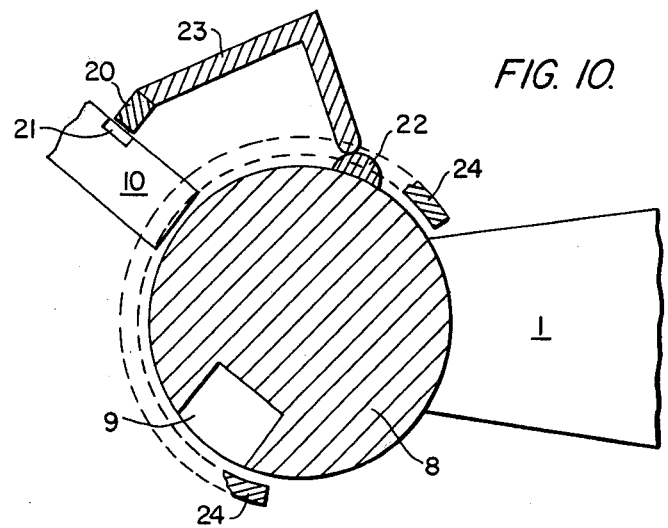
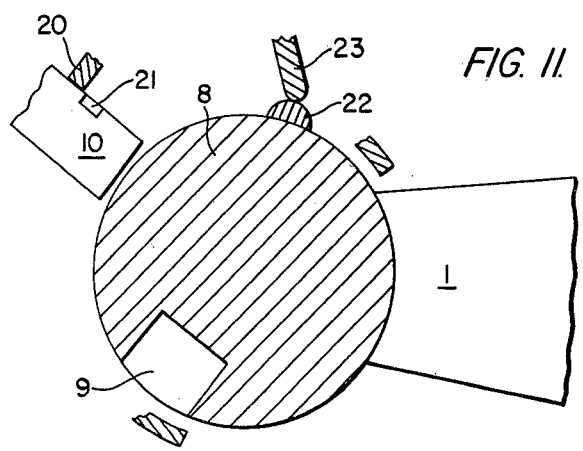

4,444,407

ANTI-THEFT DEVICE FOR MOTORCYCLES APPLIED TO THE PARKING STAND

This invention concerns a new type of anti-theft device for motorcycles and the like and is an improvement in the traditional parking stand thereof. Known anti-theft devices for motorcycles, motorized bicycles and the like consist of mechanically or electrically operated blocking devices applied to the handle-bars. Such devices are mounted in positions which allow thieves easy access and provide thieves with an opportunity to defeat them, frequently resulting in damage. The aim of this invention is to realize a safe and simple anti-theft device for motorcycles applied in positions which make theft difficult.

SUMMARY OF THE INVENTION

This aim is achieved with a device applied to the parking stand to prevent it from being raised while the device is engaged. It is automatically engaged when the motorcycle is raised up onto the stand, independently of the memory and willingness of the cyclist. It may only be disengaged by means of a key, another mechanical means or an electrical contact, depending upon the embodiment of the invention. This enhances the traditional function of the parking stand by making movement of the motorcycle impossible without disengaging the device. The lowered stand may be blocked in various ways either within the structure of the motorcycle or by external devices. The device may be unlocked with a mechanical extension or electrical circuit operated with keys, relays, buttons and the like, located on the handle-bar.

BRIEF DESCRIPTION OF THE DRAWINGS

The invention is represented in some preferred purely exemplifying variations in the attached drawings, in which:

FIGS. 8, 9, 10 and 11 show the connection-disconnection sequence for another embodiment.

DETAILED DESCRIPTION OF THE PREFERRED EMBODIMENT

Figure 1:
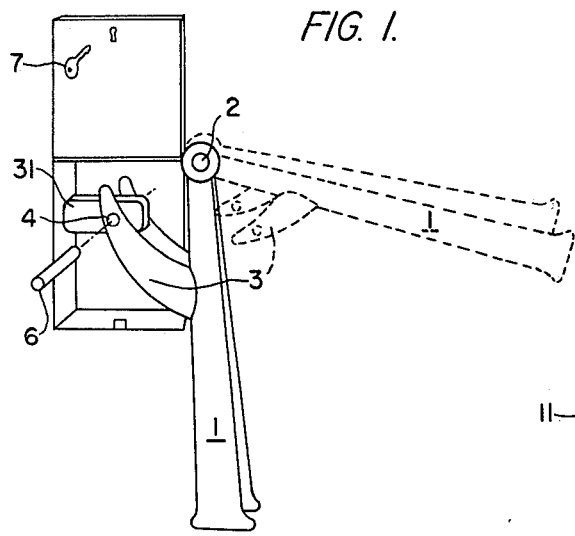
FIGS. 1 and 2 show two possible mechanical blocking devices for the stand.

In particular FIG. 1 shows stand 1 rotatable about fulcrum 2, equipped with elastic functioning structures of known type, and bearing a single or double fin 3 with apertures 4. When the motorcycle 5 is raised up for parking, and the stand is rotated, the fin 3 is inserted into a blocking device 6. Blocking device 6 includes a peg to be inserted into aperture 4 and an aligned hole in crossbar 31. The peg may be released only by a person with a key 7 or the like. A thief would have considerable difficulty in removing this device because he would be required to work at ground level on the stand, and avoiding detection would be an impossibility in the presence of any witnesses or passersby.

Figure 2:
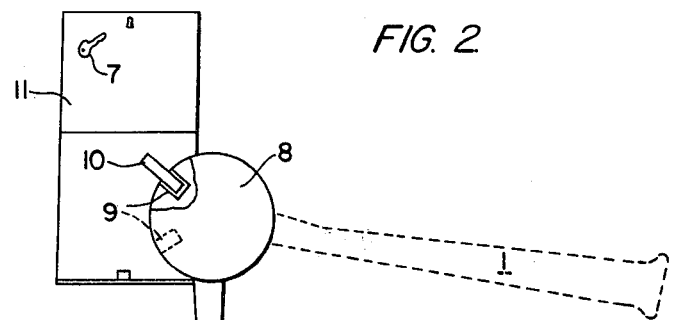

In the embodiment in FIG. 2, the end of stand 1 is joined to disk 8 which has a peripheral opening 9. When the stand is rotated, pin 10 of automatic blocking device 11 is inserted into opening 9 to prevent the raising of stand 1. Blocking device 11 is openable afterwards with key 7 or in some other way, according to design preferences.

Figure 3:
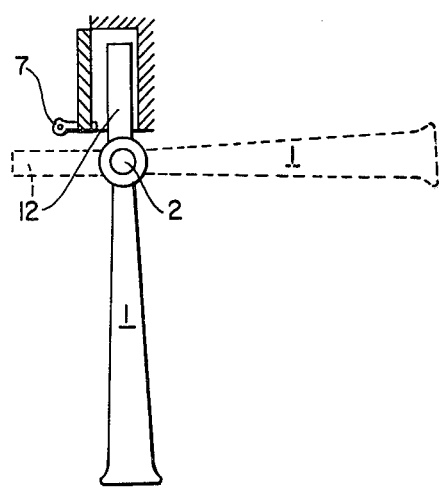
FIG. 3 shows a block acting on an internal extension of the lever formed by the stand.
Figure 4:
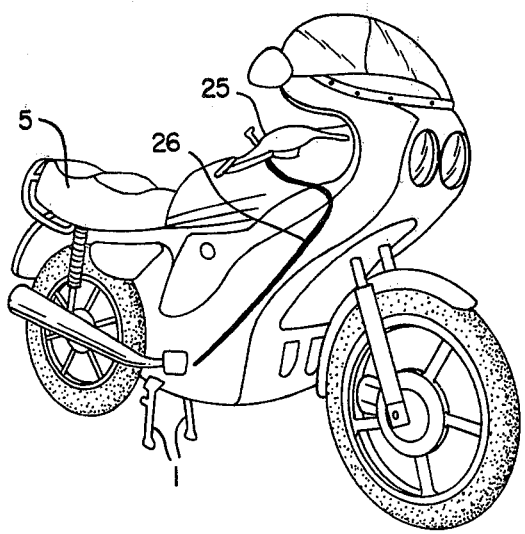
FIG. 4 shows the possible mechanical or electrical conduction of the unblocking control from the instrument panel to the stand.

In the embodiment shown in FIG. 3, stand 12 has an extension 12 beyond fulcrum 2. Rotation of the stand 1 around fulcrum 2 causes, at the end of such movement, automatic blocking of the extension 12. Extension 12 may vary in length as long as it fits in an internal space of the motorcycle 5, thus enhancing the anti-theft properties since no external component is involved.

In all the embodiments a small housing or protection device may be added to protect the mechanisms from mud and water thrown up during travel.

Figure 5:
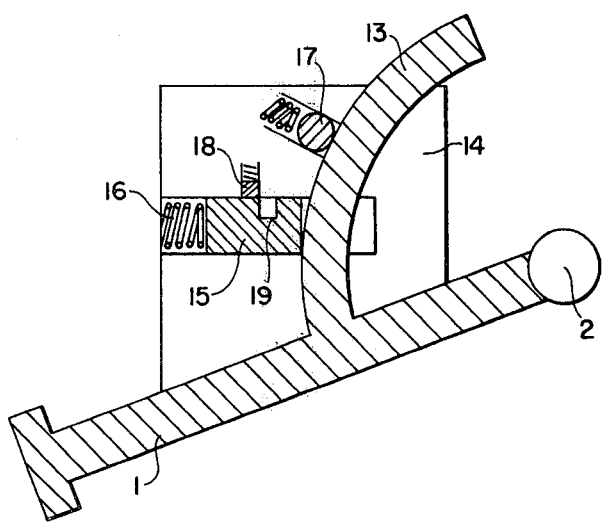
FIG. 5 shows a section of one embodiment with the stand raised.
Figure 6:
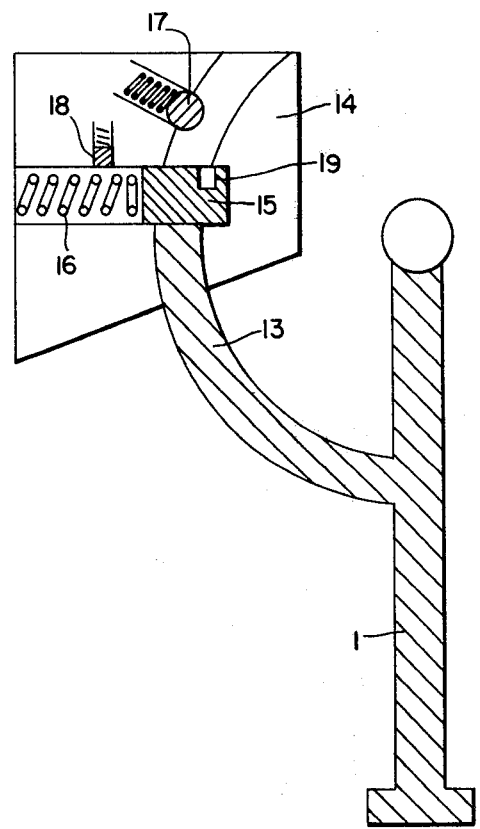
FIG. 6 shows a section of the embodiment of FIG. 5 with the stand lowered and the device engaged.
Figure 7:
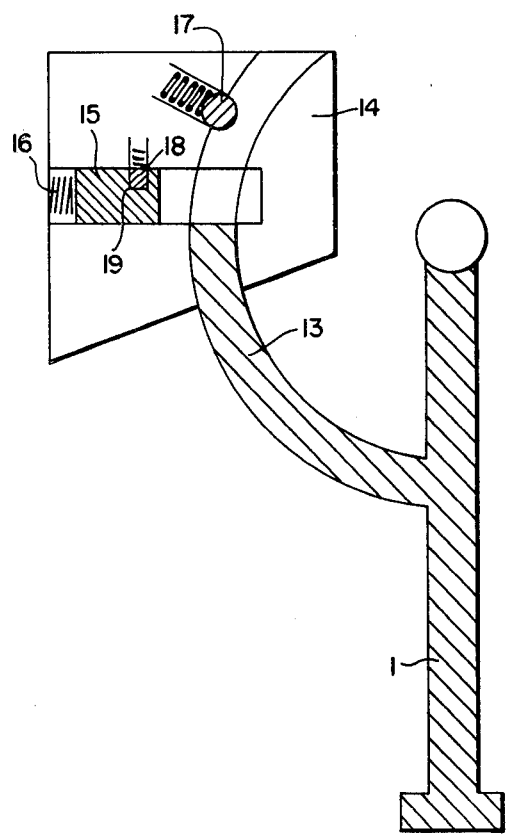
FIG. 7 shows the embodiment of FIG. 5 with the stand in the lowered position and with the device disengaged so the stand can be raised.

In the embodiment shown in FIGS. 5, 6, and 7, joined to parking stand 1 is curved arm 13. When the stand is raised, arm 13 is inserted into a suitable hole in lock 14 such that pin 15, which is pushed by spring 16, is blocked against the surface of arm 13. Push-button 17, as shown in FIG. 5, has been activated to withdraw rod 18 to release pin 15. Pin 15 had previously been moved back by the key opening the anti-theft device.

In the parked position shown in FIG. 6, arm 13 has been extracted from lock 14. Pin 15 is pushed by spring 16 into a suitable hole in lock 14, thus absolutely preventing return of arm 13 and forcing stand 1 to remain in the parked position. Push-button 17 has been released by the removal of arm 13 and so rod 18, which had engaged groove 19 to hold pin 15 retracted, presses against pin 15.

Finally, as shown in FIG. 7, when pin 15 is retracted with a key or analogous method, rod 18 is inserted in groove 19 to hold said pin 15. This allows arm 13 to be raised and the anti-theft device to be disconnected. However, when arm 13 is raised far enough to depress push-button 17, rod 18 will withdraw from groove 19, releasing and readying pin 15 to relock the stand as soon as arm 13 is again withdrawn.

In the embodiment shown in FIGS. 8, 9, 10 and 11, stand 1 is joined to disk 8. The rotation of disk 8 is prevented by the penetration of pin 10 in suitable opening 9. Said pin 10 can be raised with a key or the like until further movement is blocked by the insertion of peg 20 in slot 21, releasing the stand 1 and allowing the vehicle to be moved. The blocking condition is reestablished when stand 1 is rotated until cam or protuberance 22, through mechanical transmission 23, raises peg 20 allowing pin 10 to be urged against the disk 8. Thus when the stand 1 is lowered again disc 8 rotates until pin 10 penetrates opening 9 and locks the stand. The protuberance 22 and peg 20 are linked by mechanical transmission 23. All the movable parts are furthermore covered with small housing 24 or the like in order to prevent the entrance of mud, water or the like.

We claim:

1. An anti-theft device for a vehicle having a frame and two wheels, comprising, an elongated stand (1) supported on the vehicle frame for movement between a raised position and a lowered position, said stand when in said lowered position being operable to engage the ground to raise a wheel of the vehicle from the ground, a member (8, 13) affixed to and movable with said stand, a lock pin (10, 15) for engaging said member, said lock pin being supported for movement from a retracted position where it is spaced from said member to an extended position where it lies in the path of at least a portion of said member when the stand is in its lowered position, said lock pin being operable when in its extended position to prevent movement of the stand to its raised position, means (16) for biasing the lock pin toward its extended position, holdback means (18, 20) for engaging the lock pin and holding the lock pin at its retracted position so that the lock pin is spaced from the member, and means (17, 23) for releasing the holdback means in response to movement of the stand from its lowered position toward its raised position, said biasing means being operable to bias the lock pin directly against the member when the holdback means is released so that the lock pin will automatically move to its extended position when the stand is subsequently moved to its lowered position.

2. An anti-theft device for a vehicle having a frame and two wheels, comprising, an elongated stand rotatably mounted on the vehicle frame, said stand being adapted to rotate between a first, substantially downward, ground-engaging position and a second, substantially horizontal position, and means for preventing rotation of said stand from said first to said second position by unauthorized persons comprising an arm extending transversely from said stand and curving in the direction of rotation of said stand from said second position to said first position, a housing on said vehicle frame having a curved passageway aligned to receive said curved arm of said stand when said stand is in said second position and a transverse passageway intersecting said curved passageway, said transverse passageway having a pin therein which is urged by a spring to enter the intersection of said passageways when said stand is in said first position thereby preventing rotation of said stand to said second position and which is retractable by a mechanism operable only by authorized persons to allow said stand to be rotated from said first to said second position.

3. A device as claimed in claim 2 wherein said transverse passageway has a third passageway intersecting it at a location spaced from the intersection of said curved and transverse passageways, and a rod in said third passageway is urged by a second spring to engage and retain a groove on said pin when said pin is retracted by said mechanism.

4. A device as claimed in claim 3 wherein a fourth passageway intersects said curved passageway and a pushbutton in said fourth passageway is engaged by said curved arm as said stand approaches said second position from said first position and thereby withdraws said rod in said third passageway to release said pin in said transverse passageway.

5. An anti-theft device for a vehicle having a frame and two wheels comprising an elongated stand having a hub at one end rotatably mounted on the vehicle frame, said stand being adapted to rotate between a first substantially downward, ground-engaging position and a second substantially horizontal position, and means for preventing rotation of said stand from said first to said second position by unauthorized persons comprising a disk with a peripheral opening on said hub, a housing on the vehicle frame enclosing a portion of said disk, a pin in said housing having a locked position in which it extends into said peripheral opening in said disk when said stand is in the first position to prevent rotation to the second position and a retracted position in which it is clear of said peripheral opening, said pin having a slot arranged to receive a peg to hold said pin in its retracted position, said disk having a peripheral cam and said housing provided with a mechanical transmission which transmits motion from said cam as said stand arrives at said second position to said peg to remove said peg from said slot, and a mechanism to retract said pin operable only by authorized persons, whereby said stand may be locked in said first position by said pin entering said peripheral opening in said disk, said pin may be retracted by an authorized person and held retracted by said peg entering said slot, said stand may be moved to said second position thereby retracting said peg and readying said pin to reenter said peripheral opening in said disk upon return of said stand to said first position, and said stand may be returned to said first position automatically engaging said anit-theft device.

6. An anti-theft device for a vehicle having a frame and two wheels comprising an elongated stand rotatably mounted on the vehicle frame, said stand being adapted to rotate between a first, substantially downward, ground-engaging position and a second, substantially horizontal position, and means for preventing rotation of said stand from said first to said second position by unauthorized persons comprising a fin extending transversely from said stand and curved in the direction of rotation of said stand from said second to said first position, said fin having an aperture therein, a housing on the vehicle frame with an opening oriented to receive said fin when said stand is in said first position, a cross bar fixed in said housing and having an aperture positioned for alignment with said aperture in said fin when said stand is in said first position, a peg for insertion in said apertures in said fin and crossbar when they are aligned, and a cover on said housing which may be removed only by authorized persons and which when removed, provides such persons with access to said apertures and said peg for insertion or removal of said peg into or from said apertures, respectively.

7. An anti-theft device for a vehicle having a frame and two wheels comprising an elongated stand having a pivot at one end rotatably mounted on the vehicle frame, said stand being adapted to rotate between a first, substantially downward ground-engaging position and a second, substantially horizontal position, and means for preventing rotation of said stand from said first to said second position by unauthorized persons comprising a disk on said pivot with a peripheral opening, a housing on the vehicle frame enclosing a portion of said disk, a blocking device in said housing including a pin arranged to enter said peripheral opening in said disk when said stand is in the first position to prevent rotation to the second position, and a cover on said housing which may only be removed by authorized persons and which when removed, provides such persons with access to said peripheral opening to permit insertion or removal of said pin thereto or therefrom, respectively.

* * * * *